United States Patent [19]

Loth et al.

[11] Patent Number: 5,527,902
[45] Date of Patent: Jun. 18, 1996

[54] BEAD-SHAPED CELLULOSE PRODUCTS FOR SEPARATING AND CARRIER MATERIALS AND THEIR MANUFACTURE

[75] Inventors: Fritz Loth; Carola Fanter, both of Teltow, Germany

[73] Assignee: Fraunhofer-Gesellschaft zur Foerderung der angewandten Forschung e.V., Germany

[21] Appl. No.: 340,483

[22] Filed: Nov. 14, 1994

Related U.S. Application Data

[63] Continuation of Ser. No. 866,163, filed as PCT/DE90/00980, Dec. 17, 1990, abandoned.

[30] Foreign Application Priority Data

Dec. 29, 1989 [DE] Germany ............................ 33 67 247

[51] Int. Cl.⁶ .......................... C08B 15/00; C08B 15/10; B01J 20/22; B01J 20/26
[52] U.S. Cl. ................. 536/57; 536/84; 536/85; 536/87; 428/402
[58] Field of Search .................................. 536/57, 61, 84, 536/85, 87; 428/402

[56] References Cited

U.S. PATENT DOCUMENTS

| | | | |
|---|---|---|---|
| 3,598,245 | 8/1971 | Determann | 210/635 |
| 3,731,816 | 5/1973 | Edlund et al. | 210/500.1 |
| 4,090,022 | 5/1978 | Tsao et al. | 264/14 |
| 4,175,183 | 11/1979 | Ayers | 536/57 |

FOREIGN PATENT DOCUMENTS

| | | |
|---|---|---|
| 0047064 | 3/1982 | European Pat. Off. . |
| 0233620 | 8/1987 | European Pat. Off. . |
| 0321597 | 6/1989 | European Pat. Off. . |
| 8909643 | 10/1989 | WIPO . |

Primary Examiner—Jeffrey Mullis
Attorney, Agent, or Firm—Evenson, McKeown, Edwards & Lenahan

[57] ABSTRACT

Bead-shaped cellulose products and a process for the manufacturing of such bead-shaped porous cellulose products provide improved characteristics, particularly a hydrophilic, reversibly expandable cellulose matrix with a pore structure that can be adjusted within wide ranges in a targeted manner while non-specific mutual reactions are simultaneously suppressed by biomacromolecules.

2 Claims, No Drawings

BEAD-SHAPED CELLULOSE PRODUCTS FOR SEPARATING AND CARRIER MATERIALS AND THEIR MANUFACTURE

This application is a continuation of application Ser. No. 07/866,163, filed as PCT/DE90/00980, Dec. 17, 1990, now abandoned.

BACKGROUND AND SUMMARY OF THE INVENTION

This invention relates to bead-shaped cellulose products with an adjustable porosity which may be used as separating and carrier materials in chemistry, biotechnology, medicine, and pharmaceuticals for analytical and preparatory purposes, and to a process for their manufacture.

During the past few years, particle-shaped cellulose materials have increasingly gained in importance mainly as steady-state phases in the case of chromatographic separating and purifying processes but also as selective specific absorbents. For manufacturing such more or less porous particles, a large number of processes have been suggested. A significant object of these processes is the manufacturing of spherical porous particles in order to optimally adapt the respective, usually very special separating tasks, particularly of the separation of proteins by means of gel chromatography.

In most cases, the manufacturing of porous spherical cellulose particles takes place by producing a cellulose solution or a cellulose derivative solution, changing the solution into droplets, coagulating the droplets and regenerating the cellulose.

Differences exist mainly with respect to the type and method of the droplet formation, for example, by dripping or spraying the cellulose solution into a suitable regenerating bath or by dispersing the cellulose solution in a suitable solvent, and with respect to the type and the method of coagulating or regenerating the cellulose (compare U.S. Pat. Nos. 2,534,928 and 3,597,350, DE-OS 2 717 965, DE-PS 2 138 905, DD-PS 118 887, and JP-PS 80-44312).

In all these processes, the adjustment of a defined porosity of the cellulose matrix presents problems. For this reason, various processes have been suggested as to how the pore size can be varied, for example, by means of the concentration of the cellulose (DE-OS 1 792 230) or by additions to the cellulose derivative solution as pore forming agents (U.S. Pat. No. 4,312,980). Good results were achieved when the pore structure was set by the additional use of a duofunctional cross-linking agent of the general formula X—R—Z, wherein X and Z represent halogen groups or epoxy groups and R represents a C3 to C10-alkylene group (U.S. Pat. No. 3,597,245). Although the thus obtained products are, in principle, suitable for gel-chromatographic separations of dissolved highly molecular substances, unmodified cellulose particles have the general disadvantage that they enter into a non-specific mutual reaction with various proteins, whereby their universal usefulness is limited.

Hydroxyethyl-group-containing products and hydroxypropyl-group-containing products which, according to U.S. Pat. No. 3,598,245, can be produced by the simultaneous reaction of dried regenerated cellulose particles with a cross-linking agent, have more favorable characteristics. However, this solution has several disadvantages. Thus, for example, the running action in chromatographic columns is unfavorably influenced by the use of fiber-shaped regenerated cellulose particles. Another disadvantage is the insufficient mechanical stability of the gels which, particularly in the case of a high content of hydroxypropyl groups and a low degree of cross-linking, may lead to reduced flow velocities or even to a clogging of the columns. It is also a disadvantage that these highly expanded gels already partially dissolve in water (J. S. Ayers, M. J. Petersen, B. E. Sheerin, G. S. Bethell: *J. Chromatography* 294 (1984), Page 195–205) and can therefore not be used for chromatographic purposes. The porosity range which can be utilized for gel-chromatographic separations is relatively narrowly limited and is below $5 \times 10^4$ Dalton.

It is an object of the invention to develop bead-shaped cellulose products and a process for the manufacturing of bead-shaped porous cellulose products with improved characteristics, particularly of a hydrophilic, reversibly expandable cellulose matrix with a pore structure that can be adjusted within wide ranges in a targeted manner while non-specific mutual reactions are simultaneously suppressed by way of biomacromolecules.

The invention is based on the object of obtaining, by way of a suitable pretreatment of regenerated cellulose particles connected with a chemical modification, bead-shaped cellulose products which have advantageous characteristics, particularly a hydrophilic reversibly expandable cellulose matrix with a defined porosity and a good chemical stability and, if possible, have no non-specific mutual reactions with proteins.

DESCRIPTION OF THE INVENTION

According to the invention, this object is achieved in that bead-shaped macroporous regenerated cellulose beads moistened with water and with a water content of from 85 to 95 g/100 g total mass are first dried to a defined water content of between 10 and 95 g/100 g total mass and are subsequently reacted in the alkaline medium with a duofunctional $C_2$–$C_4$-halogen compound and/or epoxy compound as the cross-linking agent and a monofunctional halogen compound or epoxy compound as the hydroxyalkylation agent in the closed system at 313 to 373K for 10 to 360 minutes. The regenerating or cleaning of the resulting porous cellulose derivative particles takes place in a known manner by the neutralization of excess alkalihydroxide, a thorough washing-out of the byproducts, classification as well as a possible drying. In the case of drying, a prior, at least partial displacement of the water by way of methanol, ethanol or acetone or freeze drying was found to be advantageous.

According to the invention, macroporous bead-shaped particles made of regenerated cellulose moistened with water with an average degree of polymerization (DP) of from 150 to 500 are used as the cellulose starting material, their exclusion limit for macromolecules being between $10^5$ and $3 \times 10^7$ Dalton. It is advantageous for the further use, for example, in chromatographic columns, to start out from spherical cellulose particles whose particle size, according to the respective use, may be in the range of from 1 to 2,000 µm, but preferably amounts to 50 to 250 µm.

For the targeted adjustment of a defined porosity of the cellulose matrix, it is important for the cellulose particles to be partially dried to a residual water content of from 10 to 95 g/100 g overall mass, in which case the drying may take place in the conventional manner, for example, by evaporating the water at an increased temperature, possibly also by way of a displacement by a solvent that can be mixed with water, such as $C_2$–$C_3$-alcohols, acetone, dioxane, tetrahydrofurane, dimethylformamide, dimethylsulfoxide. The thus pretreated cellulose material is then reacted in a closed vessel under pressure with the duofunctional cross-linking agent and the monofunctional halogen compound or epoxy compound as the hydroxyalkylation agent while caustic alkali is added. The duofunctional cross-linking agents may, for example, be epichlorhydrine, dichlorhydrine, dibromopropanol or diepoxybutane, while preferred monofunctional hydroxyalkylation agents are ethylene oxide, propylene oxide, 2-chloroethanol and 2-chloropropanol. In addition to the extent of the pre-drying or of the removal of water, the product characteristics are determined by the used quantities of cross-linking agents and hydroxyalkylation agents.

According to the invention, for achieving the desired porosity characteristics, 0.01 to 0.5 mol cross-linking agent and 0 to 2.5 mol, preferably 0.01 to 2.5 mol, hydroxyalkylation agent are used for each mol monomeric unit of the cellulose.

As the alkaline medium, an aqueous solution of an alkali metal hydroxide, preferably caustic soda, containing 5 to 45 percent in weight is used, in which case the amount to be used corresponds at least to the stoichiometric consumption by the reactants, particularly, however, 0.1 to 10 mol, but preferably 0.5 to 5 mol per mol monomeric unit of the cellulose.

For achieving high reagent yields, the water content in the reaction mixture is kept as low as possible. In this case, inert or largely inert organic solvents, such as toluene, benzene, chlorobenzene, ethanol, propanol or acetone, may also be added for a better mixing and better distribution of the reactants. The amount of solvent to be added preferably amounts to 2 to 50 times the used cellulose mass.

In a special embodiment of the process according to the invention, additional etherifying agents are added for the introduction of additional functional groups. The admixture may take place simultaneously with the cross-linking agent, the hydroxyalkylation agent and the caustic soda or even before the drying of the macroporous bead-type cellulose moistened by water. Suitable etherifying agents for the introduction of ionic groups are halogen alkyl carboxylic acids, such as monochloracetic acid, halogen alkyl phosphonic acids, such as methyl chloride phosphonic acid; halogen alkyl sulfonic acids, such as 2-chloroethane sulfonic acid or their salts; as well as halogen alkyl amines, such as 2-chloroethane diethylamine. The amounts of the etherifying agents which are required for obtaining the customary exchange capacities are 0.2 to 1.0 mol per mol monomeric unit of the cellulose.

The advantages of the process are mainly that by using the macroporous cellulose matrix as the starting material and by its targeted partial drying, the pore system of the cellulose can be adjusted in a defined manner. Because of their good mechanical characteristics, the thus obtained bead-shaped cellulose materials are particularly suitable for gel-chromatographic purposes to mol masses of $10^6$ Dalton. By the simultaneous introduction of the very hydrophilic hydroxy alkyl groups, the non-specific mutual reaction with biomacromolecules is suppressed. In addition, because of their very hydrophilic nature, the products, in contrast to unmodified regenerated cellulose, after a suitable drying, can be expanded almost completely reversibly, whereby they can not only be handled better, but their possibilities of usage are also increased.

EXAMPLE 1

91 g bead-shaped regenerated cellulose moistened by water and with a DP of 250 (=10 g=62 mmol cellulose) of a particle size of 80 to 200 μm, a water content of 89 g/100 g overall mass and an exclusion limit of $10^7$ Dalton are intensively mixed with 15 ml caustic soda (150 mmol) containing 30 percent in weight, with 5 ml propylene oxide (72 mmol), and 0.4 ml epichlorhydrine (5 mmol) and are transferred into a pressure-proof steel beaker with a capacity of 300 ml. After the closing of the beaker and while the beaker is constantly moved, the reaction mixture is heated to 333 k in a water bath for 1.5 h. Subsequently, the beaker is cooled to approximately 303K, is opened, and the reaction material is charged into a beaker with 500 ml of water. The product is subjected to suction on a frit; remaining alkali is neutralized with diluted (1N) hydrochloric acid and is washed with water until it is free of chlorides. A white bead-shaped cellulose derivative is obtained (10.4 g dry mass) with a sedimentation volume of 13.4 ml/g and a water retention capacity of 485%. The distribution coefficients ($K_{av}$) to be determined chromatographically by way of dextrans of different molecular weights (MG) as well as by way of proteins are illustrated as sample substances in Table 1 (Sample 1).

EXAMPLE 2

Analogously to Example 1, bead-shaped regenerated cellulose moistened with water is derivatized, in which case, instead of 0.4 ml epichlorhydrine, 1.6 ml epichlorhydrine (20 mmol) are used. A white bead-shaped cellulose derivative (Sample 2) is obtained with a sedimentation volume of 14.9 ml/g and a water retention capacity of 462%. It is a surprising result that the expanding of the product, which is a measure of the pore volume, in practice, differs very little in Examples 1 and 2 although the quantity of cross-linking agent was varied extensively. The $K_{av}$- values are also in the same magnitude.

EXAMPLE 3

Bead-shaped regenerated cellulose moistened with water and of a particle size of from 80–200 μm and with a water content of 89 g/100 g overall mass is first dried in a rotary evaporator to a water content of 49 g / 100 g overall mass. 20 g of the pre-dried material, as in Example 1, are reacted with 15 ml caustic soda containing 30 percent in weight, with 5 ml propylene oxide, and 0.4 ml epichlorhydrine and are regenerated. A white bead-shaped cellulose product with a sedimentation volume of 16 ml/g and a water retention capacity of 550% is obtained. The $K_{av}$- values are illustrated in the table (Sample 3). Compared with Sample 1, they are clearly lower.

EXAMPLE 4

Macroporous bead-shaped cellulose moistened with water and of a particle size of from 80–200 μm and with a water content of 89 g/100 g overall mass is first dried in a rotary evaporator at 333K to a residual water content of approximately 10 g/100 g overall mass. 11.0 g of the pre-dried bead-shaped cellulose material, as in Example 1, are reacted with 15 ml caustic soda containing 30 percent in weight, with 5 ml propylene oxide, and 0.4 ml epichlorhydrine and are regenerated. An almost translucent expanded cellulose derivative (11.0 g dry mass) with a sedimentation volume of 21.9 ml/g and a water retention capacity of 655% is obtained. The $K_{av}$-values are also illustrated in Table 1. They are clearly lower than in the case of Samples 1 and 3.

EXAMPLE 5

Analogously to Example 4, bead-shaped cellulose is dried and derivatized, in which case, instead of 0.4 ml epichlorhydrine, 1.6 ml epichlorhydrine (20 mmol) (Sample 5) or 0.2 ml epichlorhydrine (2.5 mmol) (Sample 6) are used. The sedimentation volumes of the resulting products are 7.9 and 47.4 ml/g, and the values for the water retention capacity are 294 and 894%. In contrast to the macroporous bead-shaped cellulose types used in the moist state, in the case of the pre-dried bead-shaped cellulose types with a decreasing amount of cross-linking agent, the expansion values are increased significantly.. However, despite the increased expansion values, the $K_{av}$-values are clearly lower than in the case of the pre-dried cellulose beads with a water content of 10 and 50 g/100 g overall mass (Table 1).

EXAMPLE 6

91 g macroporous bead-shaped cellulose moistened with water is mixed with a solution of 3 g 2-chloroethane diethylamine hydrochloride in 30 ml of water for 30 minutes in the rotary evaporator and is then dried to a residual water content of 10 g/100 g overall mass. The impregnated cellulose beads are transferred to a special-steel beaker, are mixed with 15 ml caustic soda containing 30 percent in weight, with 5 ml propylene oxide, and 1.6 ml epichlorhydrine and, after the beaker is closed, are heated for 1.5 h to 353K. The regenerating of the product takes place as in Example 1. The obtained diethyl amino ethyl bead-shaped cellulose has an exchange capacity of 0.8 meq/g and a sedimentation volume of 5.2 ml/g.

EXAMPLE 7

Analogously to Example 6, bead-shaped cellulose is modified, in which case, however, 6 g 2-chloroethane diethyl amine hydrochloride, 0.4 ml epichlorhydrine, but no propylene oxide is used. The obtained bead-shaped diethyl aminoethyl cellulose has an exchange capacity of 1.3 meq/g and a sedimentation volume of 7.2 ml/g.

EXAMPLE 8

Analogously to Example 6, bead-shaped cellulose is modified, in which case, however, instead of 2-chloroethane diethyl amine hydrochloride, 3 g sodium monochloroacetate are used as the etherifying agents. The obtained bead-shaped carboxymethyl cellulose has an exchange capacity of 1.0 meq/g and a sedimentation volume of 10.1 ml/g.

EXAMPLE 9

Analogously to Example 6, bead-shaped cellulose is modified, in which case, instead of 2-chloroethane diethyl amine hydrochloride, 6 g sodium monochloroacetate as the etherifying agents, 0.4 ml epichlorhydrine are used but no propylene oxide. The obtained bead-shaped carboxymethyl cellulose has an exchange capacity of 1.5 meq/g and a sedimentation volume of 8.2 ml/g.

TABLE 1

Distribution Coefficients for Cross-Linked Bead-Shaped Hydroxy Propyl Cellulose (Bed Volume: 20 ml)

| Dextran Dalton | $K_{av}$-Values | | | | | |
|---|---|---|---|---|---|---|
| | Sample 1 | Sample 2 | Sample 3 | Sample 4 | Sample 5 | Sample 6 |
| 2,000,000 | 0.298 | 0.256 | 0.0 | 0.0 | 0.0 | 0.0 |
| 500,000 | 0.520 | 0.460 | 0.046 | 0.0 | 0.0 | 0.007 |
| 100,000 | 0.695 | 0.655 | 0.216 | 0.020 | 0.0 | 0.050 |
| 35,000 | | | 0.348 | 0.080 | 0.020 | 0.160 |
| 8,000 | | | 0.535 | 0.310 | 0.034 | 0.429 |
| 4,000 | | | 0.623 | 0.425 | 0.143 | 0.545 |
| 180+ | | | 0.743 | 0.730 | 0.463 | 0.878 |

+ = glucose

What we claim is:

1. A process for manufacturing bead-shaped cellulose products for use as separating and carrier materials, comprising the steps of drying wet macroporous regenerated cellulose beads of a size of 1 to 2,000 μm with a water content of from 85 to 95 g per 100 g total mass and an exclusion limit of $10^5$ to $3 \times 10hu 7$ Dalton to a defined water content of between 10 and 90 g per 100 g overall mass, and then simultaneously cross-linking and hydroxyalkylating the cellulose particles in an aqueous alkaline medium with 0.1 to 10 mol alkali hydroxide as the aqueous solution in a concentration of from 5 to 45 percent in weight alkali hydroxide, per mol monomeric unit of cellulose, with 0.01 to 0.5 mol of a duofunctional compound of the formula X—R'—Y, wherein X and Y are a halogen group and/or an epoxy group and R' is a $C_2$- to $C_4$-alkylene group, —CH(CH$_2$OH)—CH$_2$— or —CH$_2$—CH(OH)—CH$_3$—, per mol monomeric unit of the cellulose, and 0.01 to 2.5 mol of a monofunctional compound of the formula Z—R, wherein the monofunctional compound is a compound where Z is an epoxy group and R is equal to H or CH$_3$, or Z is a halogen and R is one of a —C$_2$H$_4$—OH, CH$_2$—CH(OH)—CH$_3$— or C$_3$H$_6$—OH group, per mol monomeric unit of the cellulose.

2. The process according to claim 1, further comprising adding at least one of inert organic solvents and 0.2 to 1.0 mol additional etherifying agents per mol monomeric unit of the cellulose at temperatures of from 213 to 373K and for a period of from 10 to 360 minutes, washing the product, classifying the product, and drying the product.

* * * * *